(12) United States Patent
Belz et al.

(10) Patent No.: US 8,907,810 B2
(45) Date of Patent: Dec. 9, 2014

(54) WATER USAGE MONITORING SYSTEM

(75) Inventors: Jeff Belz, Eastpointe, MI (US); Craig W. Selover, Huntington Woods, MI (US)

(73) Assignee: Masco Corporation, Taylor, MI (US)

( * ) Notice: Subject to any disclaimer, the term of this patent is extended or adjusted under 35 U.S.C. 154(b) by 1042 days.

(21) Appl. No.: 12/958,885

(22) Filed: Dec. 2, 2010

(65) Prior Publication Data

US 2012/0139749 A1 Jun. 7, 2012

(51) Int. Cl.
*G08B 23/00* (2006.01)
*H04Q 9/00* (2006.01)
*G01F 15/06* (2006.01)
*G01D 4/00* (2006.01)

(52) U.S. Cl.
CPC ............ *H04Q 9/00* (2013.01); *Y04S 20/322* (2013.01); *H04Q 2209/43* (2013.01); *G01F 15/063* (2013.01); *G01D 4/004* (2013.01); *Y02B 90/242* (2013.01); *Y04S 20/40* (2013.01); *Y02B 90/245* (2013.01); *H04Q 2209/82* (2013.01); *H04Q 2209/60* (2013.01)
USPC ........................................ 340/870.02; 702/45

(58) Field of Classification Search
CPC ........... G08C 2201/40; G08C 2201/42; G01D 4/004; G01D 5/00
USPC ..................... 340/870.02–870.03; 702/45–46
See application file for complete search history.

(56) References Cited

U.S. PATENT DOCUMENTS

| | | |
|---|---|---|
| 4,420,811 A | 12/1983 | Tarnay et al. |
| 5,056,107 A | 10/1991 | Johnson et al. |
| 5,058,032 A | 10/1991 | Farrell et al. |
| 5,448,230 A | 9/1995 | Schanker et al. |
| 5,553,094 A | 9/1996 | Johnson et al. |
| 7,508,318 B2 | 3/2009 | Casella et al. |
| 2003/0088527 A1 | 5/2003 | Hung et al. |
| 2005/0235306 A1 | 10/2005 | Fima |

(Continued)

FOREIGN PATENT DOCUMENTS

| | | |
|---|---|---|
| AU | 2008100552 | 10/2008 |
| AU | 2008101243 | 2/2009 |

(Continued)

OTHER PUBLICATIONS

United Kingdom Search Report for Application No. GB1120684.4 dated Jul. 5, 2012.
United Kingdom Examination Report for Application No. GB1120684.4 dated Jan. 17, 2013.

*Primary Examiner* — Albert Wong
(74) *Attorney, Agent, or Firm* — Carlson, Gaskey & Olds, P.C.

(57) ABSTRACT

An example water usage monitoring system includes at least one sensor communicating at least one parameter relating to water usage. At least one microcontroller represents a location with each microcontroller in communication with at least one of the sensors and having at least one input for selectively receiving said parameters, a counter, an accumulator that utilizes said counter and said parameters received from the at least one input for a discrete count to create a data packet in response to a change in at least one of said parameters, and a transmitter for wirelessly sending said data packet. The system also includes a data collection device configured to receive and combine at least one data packet from the at least one microcontroller into an information set. The data collection device is configured to transmit the information set. A storage device is configured receive the information set from the data collection device.

27 Claims, 5 Drawing Sheets

(56) References Cited

U.S. PATENT DOCUMENTS

| | | |
|---|---|---|
| 2006/0137090 A1 | 6/2006 | Jeffries et al. |
| 2006/0261941 A1 | 11/2006 | Drake et al. |
| 2007/0013547 A1 | 1/2007 | Boaz |
| 2007/0206521 A1 | 9/2007 | Osaje |
| 2010/0188254 A1 | 7/2010 | Johnson et al. |

FOREIGN PATENT DOCUMENTS

| | | |
|---|---|---|
| CA | 2220242 | 5/1998 |
| CA | 2593568 | 1/2009 |
| DE | 69720139 | 3/2004 |
| WO | 9718359 | 5/1997 |
| WO | 0033070 | 6/2000 |

WATER USAGE MONITORING SYSTEM

BACKGROUND

The invention relates to monitoring systems, specifically monitoring water usage.

Water usage varies in residential and commercial plumbing systems. Faucets and valves with conventional hot and cold handles (or other control means) are widely used to control output water. Sensors have been used to determine a number of characteristics of water usage by monitoring and sending water parameters within a plumbing system. The information provided by sensors has a wide range of uses. Devices having a microcontroller can process information provided by sensors, as well as other available data, to provide output to external devices for various purposes or uses.

SUMMARY

An example water usage monitoring system includes at least one sensor communicating at least one parameter relating to water usage. At least one microcontroller represents a location with each microcontroller in communication with at least one of the sensors and having at least one input for selectively receiving said parameters, a counter, an accumulator that utilizes said counter and said parameters received from the at least one input for a discrete count to create a data packet in response to a change in at least one of said parameters, and a transmitter for wirelessly sending said data packet. The system also includes a data collection device configured to receive and combine at least one data packet from the at least one microcontroller into an information set. The data collection device is configured to transmit the information set. A storage device is configured receive the information set from the data collection device.

An example method of monitoring water usage includes providing at least one microcontroller representing a location. Each microcontroller is in communication with at least one sensor and has a counter, at least one input, and a transmitter. Parameters are communicated from at least one sensor to an input in response to a change in water usage parameters. A data packet is created utilizing the counter and parameters in response to a change in at least one of the parameters. The data packet is transmitted to a data collection device wirelessly via a transmitter. Each data packet is received from each of the microcontrollers. An information set is created including each received data packet. The information set is sent to a storage device via the internet.

These and other features of the present disclosure can be best understood from the following specification and drawings, the following of which is a brief description.

DETAILED DESCRIPTION

Figure 1:
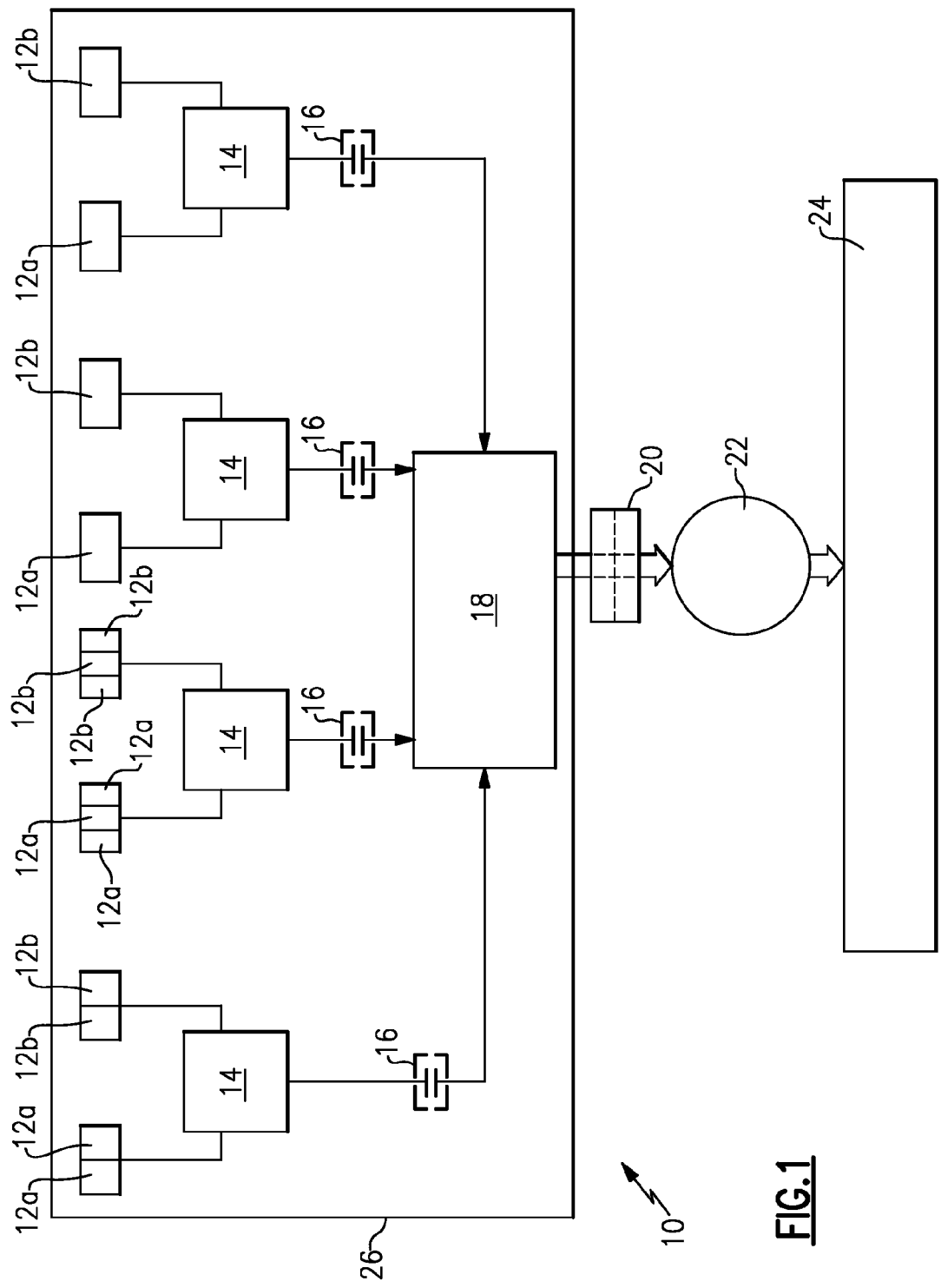
FIG. 1 shows an example water usage monitoring system.

Referring to FIG. 1, a water usage monitoring system 10 includes a plurality of sensors 12a, 12b are shown. Each sensor 12a, 12b monitors water flow parameters at a location. The system 10 also includes a plurality of nodes 14, each node 14 in communication with at least one sensor 12a, 12b. Each node 14 is referenced to a location, such as, for example, a kitchen, bathroom or shower, or combination thereof. However, other locations may be used. In this example, the sensors 12a, 12b and nodes 14 are all located within a house 26. However, it is within the contemplation of this disclosure to use the system 10 in other locations.

After a certain period of time, or counting sequence, each data packet 16 created by each node 14 is sent to a data collection device 18, such as a personal computer or the like. The data collection device 18 receives data packets 16 from a plurality of nodes 14 over a period of time. The data collection device 18 further processes the data packets 16 received from the plurality of nodes 14 into an information set 20, as will be described in further detail below. The data collection device 18 sends the information set 20 over the internet 22, or other similar network, to a storage device 24, such as a remote personal computer or server, etc. The storage device 24 stores the information set 20 received and allows a user to view the information set 20.

Figure 2:
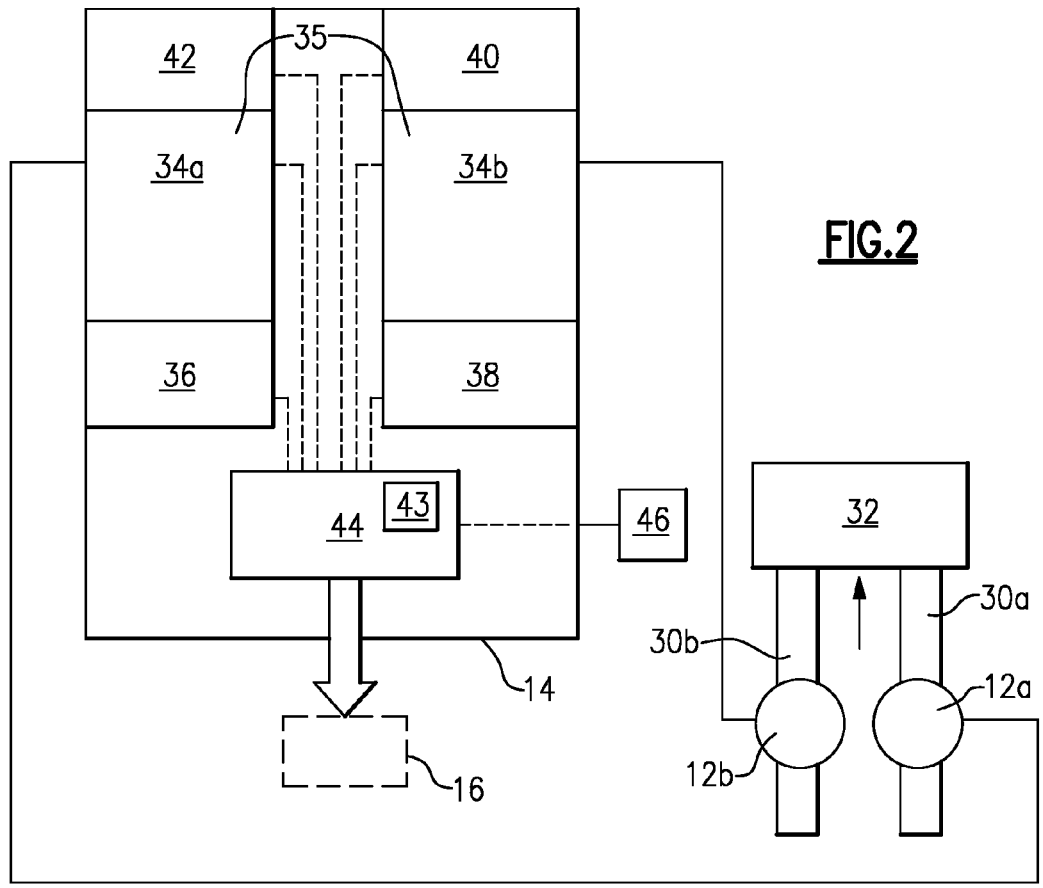
FIG. 2 shows an example set of sensors and node of the water usage monitoring system of FIG. 1.

Referring to FIG. 2, with continued reference to FIG. 1, an example arrangement of sensors 12a, 12b and sensor node 14 are shown in greater detail. In one example, the sensors 12a, 12b are inside of a water source 30, such as a pipe or other similar water communication means. The water source 30 carries water to a location 32 such as, but not limited to, a sink or shower. In one example, the system 10 is within a heating or cooling system. However, the system 10 contemplates any location where water is provided. The sensors 12a, 12b are generally positioned to be able to determine the water usage parameters from the water source 30.

Each node 14 receives water usage parameters from at least one sensor 12a, 12b and processes the information, in conjunction with a measurement of time, to create a data packet 16 having real time data on water usage parameters.

In one example, the sensors 12a, 12b are configured to determine water flow parameters. Sensor 12a is located within a hot water source 30b and sensor 12b is located within a cold water source 30a. The sensor 12a communicates flow information to a first channel 34a of a first input 35 within the node 14. Therefore, the node 14 receives hot water flow rate parameters. The sensor 12b sends cold water flow parameters to the second channel 34b of the first input 35, therefore receiving cold water flow rate parameters in the node 14. Although only flow sensors 12a, 12b are shown in this example, it is within the contemplation of this disclosure to use additional sensors providing additional parameters, as will be shown in greater detail below.

The example node 14 includes the above-mentioned input 35 having a first channel 34a and second channel 34b, as well as a node address generator 36, a counter 38, such as a real time clock, a power regulator 40, and a transmitter 42, such as a blue tooth radio or other communication device. The node 14 also includes and is controlled by a microcontroller 44 which is in communication with the node address generator 36, the counter 38, flow input channels 34a, 34b, the transmitter 42, and the power regulator 40. The microcontroller 44 includes an accumulator 43 which allows the microcontroller 44 to combine parameters and other data into a data packet 16. A battery 46, such as 9-volt battery, is connected to the node 14 to power the various parts, specifically the microcontroller, of the node 14. The power regulator 40 regulates the voltage throughout the node 14.

In this example, the channels 34a, 34b receive parameters from the sensors 12a, 12b at time intervals, dependent on the detection of a change in water flow. If no change in water flow rate is detected, the microcontroller 44 will instruct the flow input channels 34a, 34b to receive data at a first time interval such as every two seconds from their respective sensors 12a, 12b and will not log the parameters. This first time interval is indicative of a static state. If a change in water flow is reported from either sensor 112a, 112b, the microcontroller instructs the flow input channels 34a, 34b to receive water flow parameters from their respective sensors 12a, 12b at a second time interval such as four times per second. This second time interval is indicative of an active state. A change in water flow is considered to be when the sensor 12a, 12b detects is a ¼ gallon or more change in the flow rate. It is within the contemplation of this disclosure to use other time intervals for a static state and an active state as well as other indicators of substantial change in various parameters. Using a static state and an active state allows for savings in battery power. When a change in water flow rate is detected, the microcontroller 44 creates a data packet 16 at each specified time interval including at least a time stamp from the counter 38 and the water usage parameters from the input 35.

When the sensors 12a, 12b communicate to the microcontroller 44 that there is no change in flow rate for a certain time period, such as five seconds, the microcontroller 44 will transmit each of the created and logged data packets 16. Therefore, the microcontroller 44 allows the node to continuously record flow information from the sensors 12a, 12b as well as recognizing when there is a change in flow rate. When there is a change in flow rate, the microcontroller 44 instructs the sensors 112a, 112b to send information at a greater time interval so as to gain and record as much information on the change of water flow rate within the source 30. As soon as the water flow rates returns to a steady state, such as when a user turns off a faucet, the microcontroller 44 sends the recorded data packets 16 on that particular instance of variable water flow. Since each data packet has a time stamp, or indicator, a user is able to monitor not only how long the water usage parameter was changing, but also the time between changes in water usage parameters as well as the frequency of changes in water usage parameter. In this way, the system 10 is able to monitor water usage parameters in real time as well as record any patterns and changes in the water usage at any water source 30.

Figure 3:
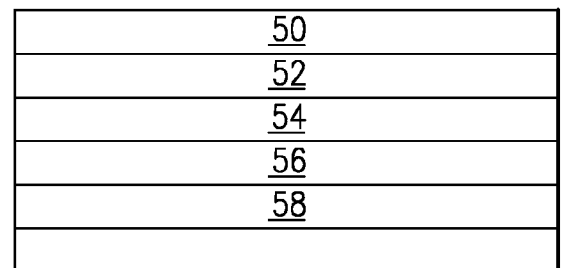
FIG. 3 shows an example data packets.

Referring to FIG. 3, with continued reference to FIG. 2, an example data packet 16 includes information generated by the microcontroller 44 and received from other parts of the node 14. In one example, the data packet 16 includes the hot water flow parameters and cold water flow parameters in location 50 and a time stamp 52 generated by the real time clock 38 and the microcontroller 44 to identify exactly when the data 50 was received. The data packet may include temperature parameters and pressure parameters as well. The data packet 16 also includes a battery read out 54, which the microcontroller 44 receives from the battery 46 to indicate whether battery strength is at an acceptable level. The data packet 16 also includes a node address 56, generated by the node address generator 36, which provides an identifier for the specific data 50 being sent in the data packet 16 by the microcontroller 44. The data packet 16 also includes a node identifier 58, which identifies the particular node 14 which is sending the data packet 16. Although certain information is identified for use in a data packet 16, it is within the contemplation of the invention for more or less information to be provided in the data packet 16, depending upon the capabilities of the system 10.

Figure 4:
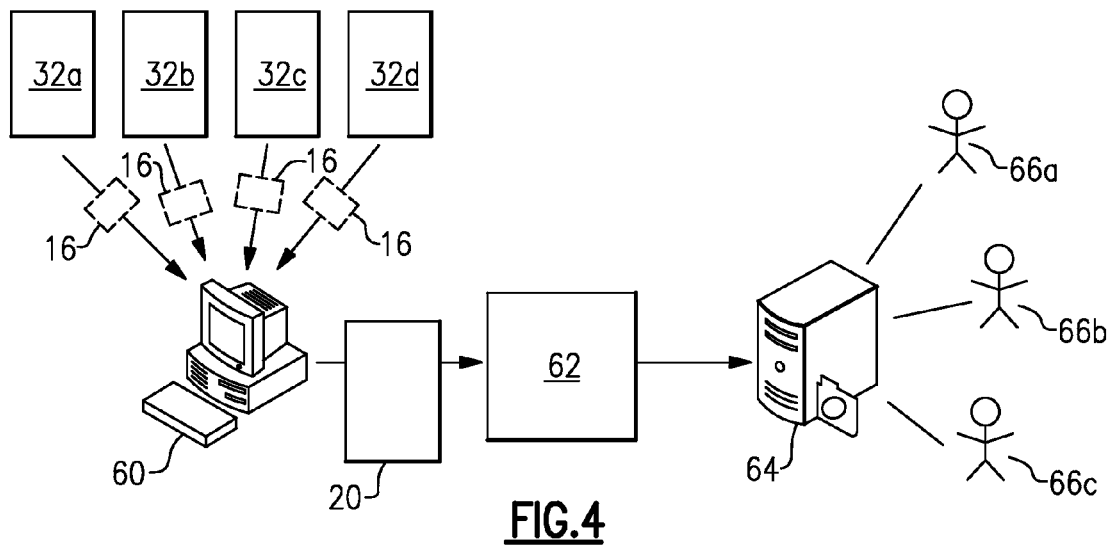
FIG. 4 shows an example data collection device and storage device of the water usage monitoring system of FIG. 1.

Referring to FIG. 4, with continued reference to FIGS. 1-2, a plurality of nodes 32a-32d are shown. Each node 32a-32d relates to a location. In one example, the locations are a kitchen sink 32a, a first bathroom faucet 32b, a second bathroom toilet 32c, and a shower 32d. However, any locations requiring water flow may be used. Each of the plurality of nodes 32a-32d transmits data packets 16 to a data collection device 60. Depending on the frequency of use, the data collection device 60 will receive more or less data packets from one node 14 relative to the other nodes 14.

The data collection device 60 receives the data packets 16 and temporarily stores them, using a predetermined program. The data collection device 60 is able to store and convert each of the data packets 16 into one single information packet 20, or file. However, even though the data collection device 60 is able to store everything from each data packet 16 in a single information set 20, the information set 20 still maintains the information in each data packet 16 such that a later user is able to determine exactly what information and parameters came from each data packet 16.

In one example, the data collection device 60 will transmit completed information sets 20 over the internet 62 to a storage device 64, such as a remote personal computer or server or the like.

In one example, the data collection device will transmit information packets one to two times per day. However, other intervals may be used. Once the storage device 64 receives an information set 20, it will store all information sets 20 from multiple data collection devices 60 to be further accessed and used by a user 66.

In one example, the user is a third party 66a, such as a monitoring company, who will monitor the water usage information coming from each data collection device 60 to watch for irregular water usage as well as low battery power. The third party may contact the owner of the home 26 to report any irregularities or problems.

In one example, the user 66b is the homeowner, allowing a person to monitor water usage within their own home 26 as they see fit.

In one example, the user 66c is a utility company, which may monitor water usage to report any irregularities or problems to the homeowner, as well as to offer assistance in creating more efficient water usage based on the received information sets 20.

In one example, the microcontroller 44 includes a heartbeat feature. The heartbeat feature includes programming the microcontroller 44 to have a maximum time period between sending data packets 16. In one example, this time period is 24 hours. When a microcontroller 44 reaches its maximum time period without receiving any detection of a change in identified water usage parameters, it will send a data packet 16 indicating that there has been no change in water usage parameters and battery strength, as well as other suitable information. In this way, if water usage is not being reported properly (i.e. malfunctioning sensors) or if battery strength is low despite no water use, the problems can be addressed to maintain a system 10 that is working properly at all times.

Figure 5:
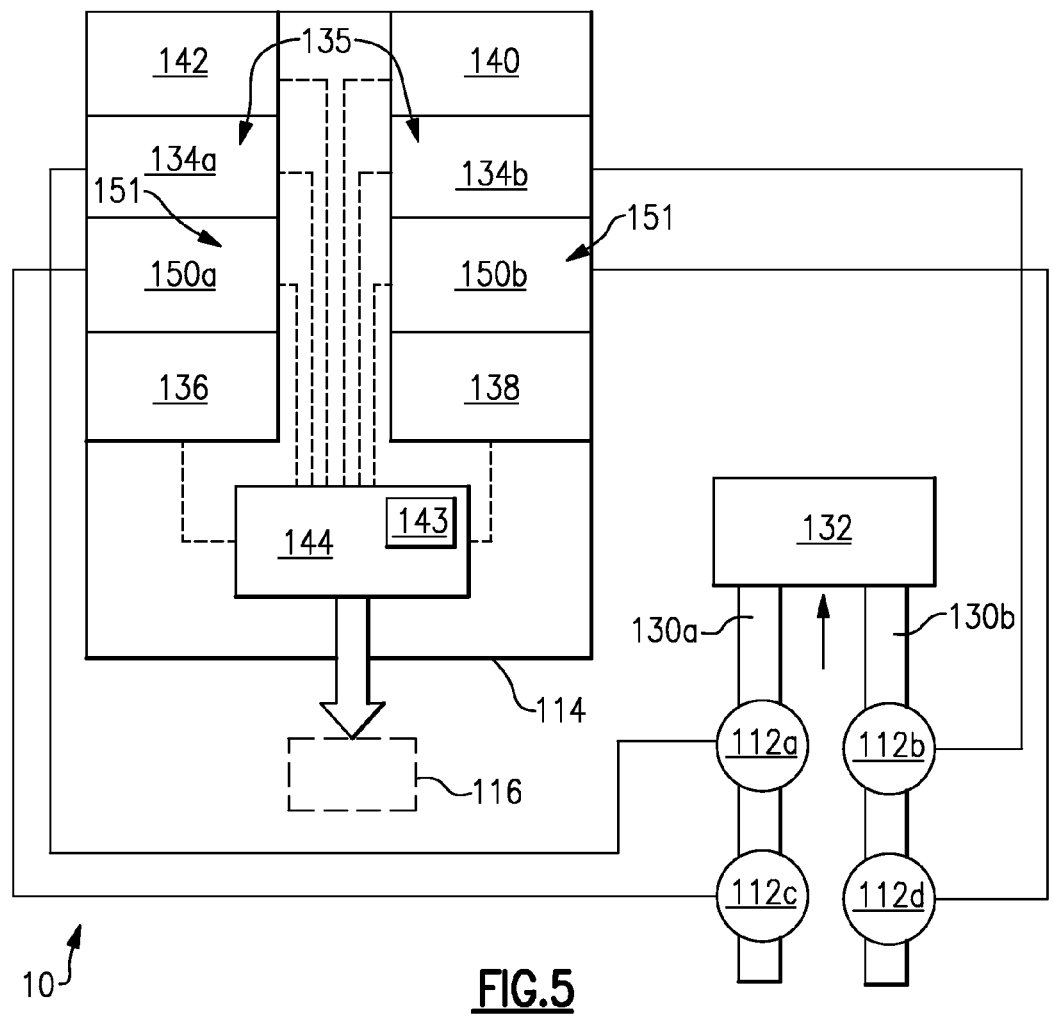
FIG. 5 shows another example set of sensors and node of the water usage monitoring system of FIG. 1.

Referring to FIG. 5, with continued reference to FIG. 1, an example arrangement of sensors 112a-112d and sensor node 114 are shown in greater detail. In one example, the sensors 112a-112d are inside of a water source 130, such as a pipe or other similar water communication means. The water source 130 carries water to a location 132 such as, but not limited to, a faucet, sink, or shower. However, the system 10 contemplates any location where water is provided or used (e.g., such as in a hot water heater or cooling coil). The sensors 112a-112d are generally positioned to be able to determine the water usage parameters from the water source 130.

In this example, the sensors 112a, 112b are configured to determine water flow parameters while sensors 112c, 112d are configured to determine water temperature parameters. Sensors 112a, 112c are located within a hot water source 130a and sensors 112b, 112d are located within a cold water source 130b. The sensor 112a communicates flow information to a first channel 134a of a first input 135 within the node 114. Therefore, the first channel 134a receives hot water flow rate parameters. The sensor 112b sends cold water flow parameters to the second channel 134b of the first input 135, therefore receiving cold water flow data in the node 114. The sensor 112c communicates temperature information to a first channel 150a of a second input 151 within the node 114. Therefore, the node 114 receives hot water temperature parameters. The sensor 112d sends cold water temperature parameters to the second channel 150b of the second input 151, therefore receiving cold water temperature parameters in the node 114.

The example node 114 includes the above-mentioned input 135, 151, as well as a node address generator 136, a counter 138, such as a real time clock, a power regulator 140, and a transmitter 142, such as a blue tooth radio or other communication device. The node 114 also includes and is controlled by a microcontroller 144 which is in communication with the node address generator 136, the counter 138, inputs 135, 151, the transmitter 142, and the power regulator 140. The microcontroller 144 includes an accumulator 143 which allows the microcontroller 144 to combine parameters and other data into a data packet 16. A battery 146, such as 9-volt battery, is connected to the node 114 to power the various parts, specifically the microcontroller 144, of the node 114.

In this example, the channels 134a, 134b of input 135 receive water flow parameters from the sensors 112a, 112b at time intervals, dependent on the detection of a change in either water flow or water temperature parameters. Similarly, the channels 150a, 150b of input 151 receive the water temperature parameters at time intervals, dependent on the detection of a change in either water flow or water temperature parameters. If no change water flow rate or water temperature is being detected, the microcontroller 144 will instruct the flow input channels 134a, 134b, 150a, 150b to receive data every two seconds from their respective sensors 112a-112d and will not log the received parameters. When a change in either water flow rate or water temperature is detected from any sensor 112a-112d, the microcontroller 144 instructs the inputs 135, 151 to receive water flow and water temperature parameters from their respective sensors 112a-112d at four times per second. A change in water flow is detected when the sensor 112a, 112b detects is a ¼ gallon or more change in the flow rate. A change in water temperature is detected when the sensor 112c, 112d detects a 10° temperature change or the like. It is within the contemplation of this disclosure to use other time intervals for both a non-flow state and a flow state as well as other indicators of substantial change in various parameters. When a change in water flow rate or water temperature is detected, the microcontroller 144 creates a data packet 16 at the specified time interval including at least a time stamp from the counter 138 and the water usage parameters from the inputs 135, 151.

When the sensors 112a, 112b communicate to the microcontroller 144 that there is no flow change and no temperature change for a certain time period, such as five seconds, the microcontroller 144 will transmit each of the created and logged data packets 16. Therefore, the microcontroller 144 allows the node 114 to continuously record flow information and temperature information from the sensors 112a-112d as well as recognizing when there is a change in flow rate or temperature. When there is a change in flow rate, the microcontroller 144 instructs the sensors 112a-112d to send information at a greater time interval so as to gain and record as much information on the change of water flow rate within the sources 130. As soon as the change in water flow rate and water temperature returns to steady state such as when a user turns off a faucet, the microcontroller 144 sends the recorded data packets 16 on that particular instance of variable water usage. In this way, the system is able to monitor water usage parameters in real time as well as record any patterns and changes in the water usage at any water source 130.

Figure 6:
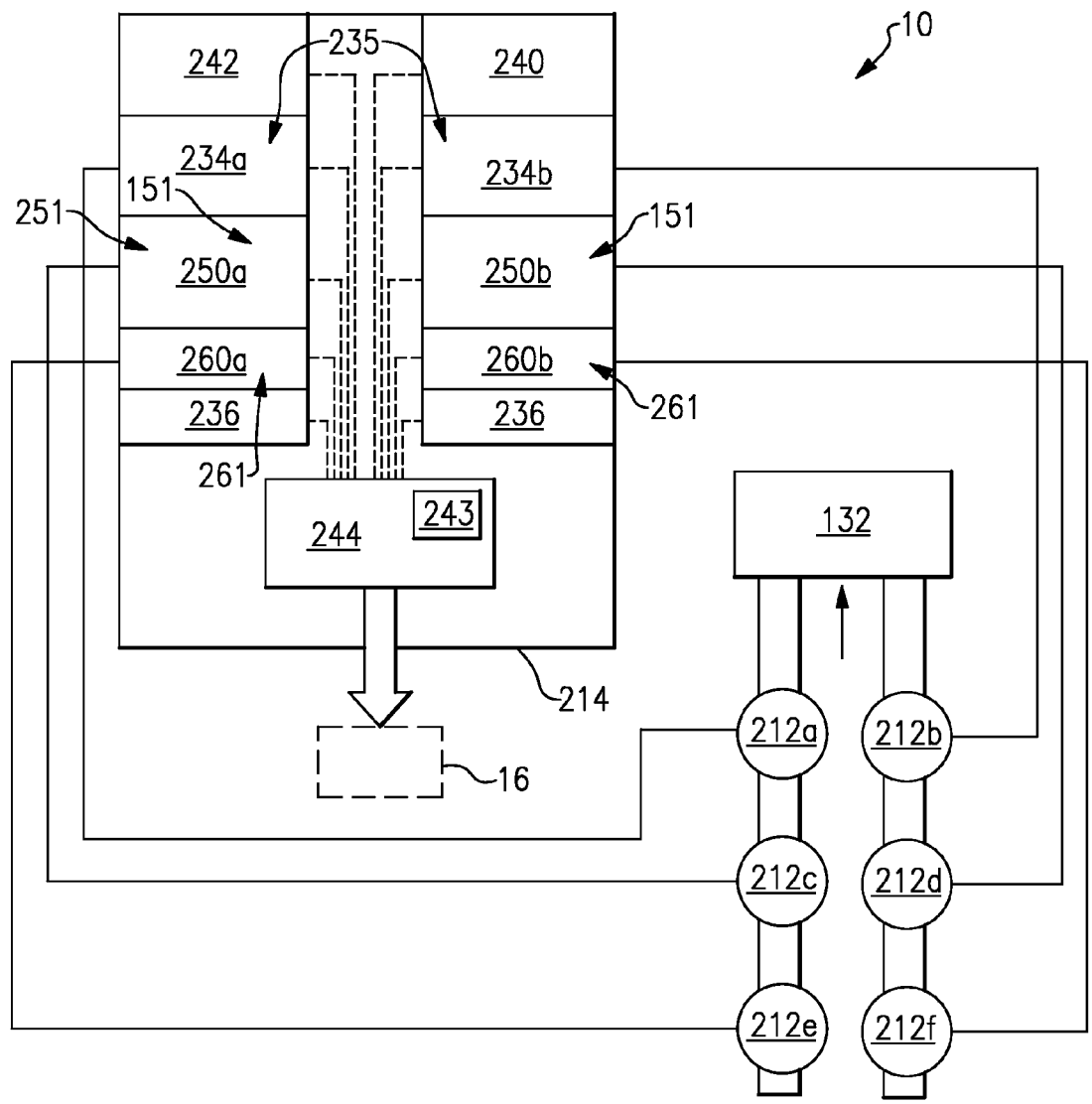
FIG. 6 shows another set example set of sensors and node of the water usage monitoring system of FIG. 1.

Referring to FIG. 6, with continued reference to FIG. 1, an example arrangement of sensors 212a-212f and sensor node 214 are shown in greater detail. In one example, the sensors 212a-112f are inside of a water source 130, such as a pipe or other similar water communication means. The water source 130 carries water to a location 132 such as, but not limited to, a faucet, sink, or shower. However, the system 10 contemplates any location where water is provided. The sensors 212a-212f are generally positioned to be able to determine the water usage parameters from the water source 130.

In this example, the sensors 212a, 212b are configured to determine water flow parameters, sensors 212c, 212d are configured to determine water temperature parameters, and sensors 212e, 212f are configured to determine water pressure parameters. Sensors 212a, 212c, 212e are located within a hot water source 230a and sensors 212b, 212d, 212f are located within a cold water source 230b. The sensor 212a communicates flow information to a first channel 234a of a first input 235 within the node 214. Therefore, the first channel 234a receives hot water flow rate parameters. The sensor 212b sends cold water flow parameters to the second channel 234b of the first input 135, therefore receiving cold water flow parameters in the node 214. The sensor 212c communicates temperature information to a first channel 250a of a second input 251 within the node 214. Therefore, the first channel 250a receives hot water temperature parameters. The sensor 212d sends cold water temperature parameters to the second channel 250b of the second input 251, therefore receiving cold water temperature parameters in the node 214. The sensor 212e communicates pressure information to a first channel 260a of a third input 261 within the node 214. Therefore, the first channel 250a receives hot water pressure parameters. The sensor 212f sends cold water pressure parameters to the second channel 250b of the third input 261, therefore receiving cold water pressure parameters in the node 214.

The example node 214 includes the above-mentioned inputs 235, 251, 261, as well as a node address generator 236, a counter 238, such as a real time clock, a power regulator 240, and a transmitter 242, such as a blue tooth radio or other similar communication device. The node 214 also includes and is controlled by a microcontroller 244 which is in communication with the node address generator 236, the counter 238, inputs 235, 251, 261, the transmitter 242, and the power regulator 240. The microcontroller 244 includes an accumulator 243 which allows the microcontroller 244 to combine parameters and other information into a data packet 16. A battery 246, such as 9-volt battery, is connected to the node 214 to power the various parts, specifically the microcontroller 244, of the node 214.

In this example, the channels 234a, 234b of input 235 receive water flow parameters from the sensors 212a, 212b at time intervals, dependent on the detection of a change in either water flow, water temperature, or water pressure parameters. Similarly, the channels 250a, 250b of input 251 receive the water temperature parameters and the channels 260a, 260b of input 261 receive the water pressure parameters at time intervals, dependent on the detection of a change in one of water flow, water temperature, or water pressure parameters. If no change water flow rate is being detected, the microcontroller 244 will instruct the flow input channels 234a, 234b, 250a, 250b, 260a, 260b to receive data every two seconds from their respective sensors 212a-212f and will not log the received parameters. When a change in one of water flow rate, water temperature, or water pressure is reported from any sensor 212a-212f, the microcontroller 244 instructs the inputs 235, 251, 261 to receive water flow, water temperature, and water pressure parameters from their respective sensors 212a-212f at four times per second. A change in water flow is detected when the sensor 212a, 212b detects is a ¼ gallon or more change in the flow rate. A change in water temperature is detected when the sensor 212c, 212d detects a 10° temperature change. The change in pressure can be detected based upon a predetermined amount. It is within the contemplation of this disclosure to use other time intervals for both a non-flow state and a flow state as well as other indicators of substantial change in various parameters. When a change in water flow rate or water temperature is detected, the microcontroller 244 creates a data packet 16 at each specified time interval including at least a time stamp from the counter 238 and the water usage parameters from the inputs 235, 251, 261.

When the sensors 212a-212f communicate to the microcontroller 244 that there is no flow change, temperature change, or pressure change for a certain time period, such as five seconds, the microcontroller 244 will transmit each of the created and logged data packets 16. Therefore, the microcontroller 244 allows the node 214 to continuously record flow information and temperature information from the sensors 212a-212f as well as recognizing when there is a change in water flow rate, temperature, or pressure. When there is a change in flow rate, temperature, or pressure, the microcontroller 244 instructs all sensors 212a-212f to send information at a greater time interval so as to gain and record as much information on the change of water usage parameters within the sources 230. As soon as the change in water flow rate, water temperature, and water pressure returns to a steady state, such as when a user turns off a faucet, the microcontroller 244 sends the recorded data packets 16 on that particular instance of variable water usage. In this way, the system is able to monitor water usage parameters in real time as well as record any patterns and changes in the water usage at any water source 230.

Figure 7:
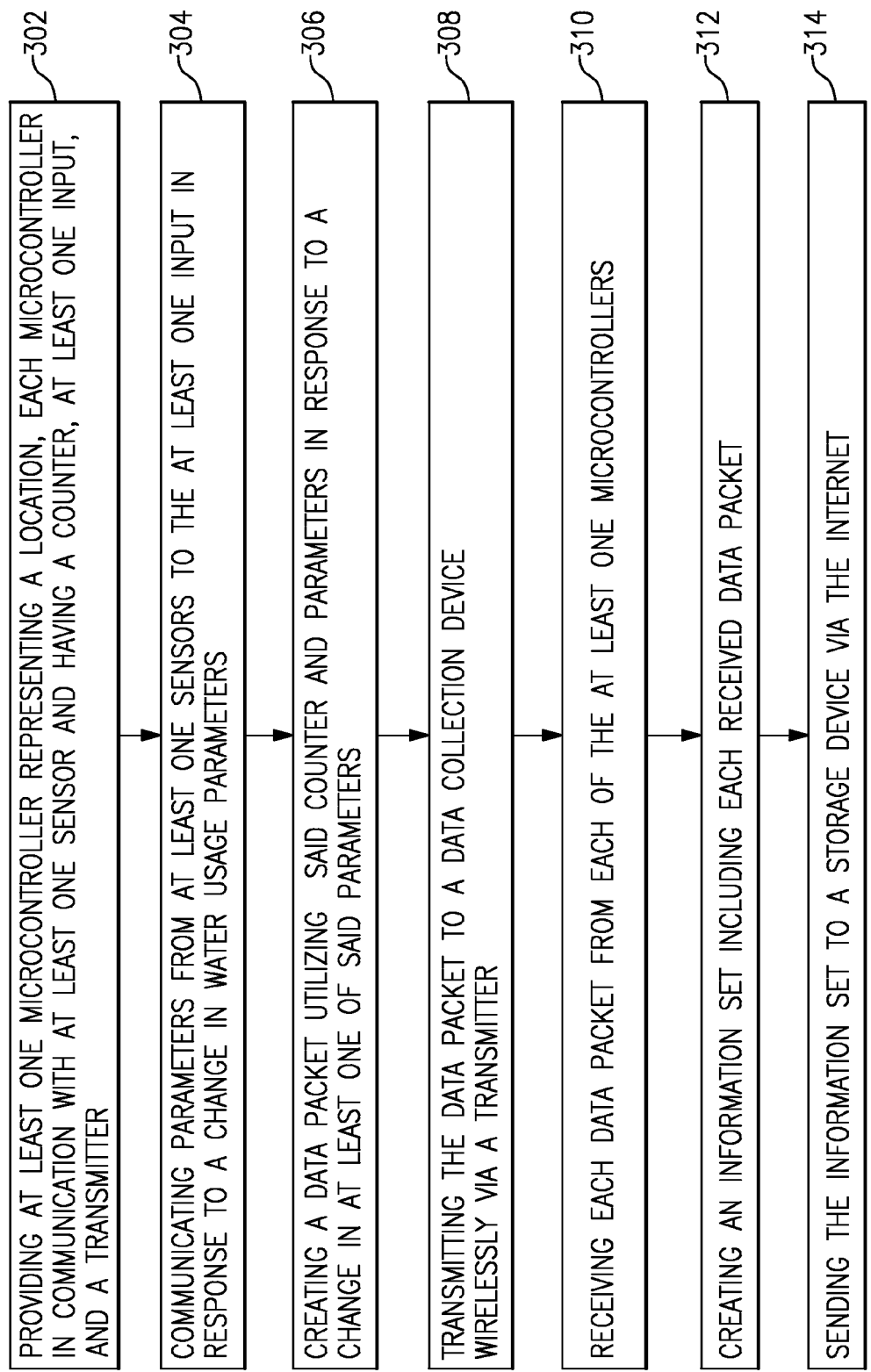
FIG. 7 shows a method of monitoring water usage.

Referring to FIG. 7, a method of monitoring water usage includes providing at least one microcontroller representing a location. Each microcontroller is in communication with at least one sensor and has a counter, at least one input, and a transmitter 302. Parameters are communicated from at least one sensor to an input in response to a change in water usage parameters 304. A data packet is created utilizing the counter and parameters in response to a change in at least one of the parameters 306. The data packet is transmitted to a data collection device wirelessly via a transmitter 308. Each data packet is received from each of the microcontrollers 310. An information set is created including each received data packet 312. The information set is sent to a storage device via the internet 314.

Although a preferred embodiment of this disclosure has been disclosed, a worker of ordinary skill in this art would recognize that certain modifications would come within the scope of this disclosure. For that reason, the following claims should be studied to determine the true scope and content of this disclosure.

What is claimed is:

1. A water usage monitoring system comprising:
   at least one sensor communicating at least one parameter relating to water usage;
   at least one microcontroller representing a location, each microcontroller in communication with at least one of said sensors and having
   at least one input for selectively receiving said at least one parameters, wherein the at least one input includes an active skate and a static state, wherein the at least one input is configured to selectively receive the at least one parameter at a first time interval in the active state and a second time interval in the static state, wherein the first time interval differs from the second time interval
   a counter,
   an accumulator that utilizes said counter and said parameters received from the at
   least one input for a discrete count to create a data packet in response to a change in at least one of said parameters, and
   a transmitter for wirelessly sending said data packet;
   a data collection device configured to receive and combine at least one data packet from the at least one microcontroller into an information set, wherein the data collection device is configured to transmit the information set; and
   a storage device configured receive the information set from the data collection device.

2. The system of claim 1, wherein the parameter is water flow rate.

3. The system of claim 2, further comprising at least one additional sensor, wherein the parameter for the additional sensor is water temperature.

4. The system of claim 2, further comprising at least one additional sensor, wherein the parameter for the additional sensor is water pressure.

5. The system of claim 1, wherein the data packet includes a plurality of available parameters relating to water usage, a time stamp, a battery strength reading, and an identifier, wherein the microcontroller includes a node address generator configured to create said identifier.

6. The system of claim 1, wherein the transmitter is a Bluetooth radio.

7. The system of claim 1, wherein each input has a first channel to receive parameters from a cold water source and a second channel to receive parameters from a hot water source.

8. The system of claim 1, wherein said system monitors all water usage within a home.

9. The system of claim 1, wherein said data collection device receives data packets from at least one microcontroller at a plurality of independent locations.

10. The system of claim 9, wherein the data collection device receives data packets at different frequencies from the at least one microcontroller.

11. The system of claim 1, wherein said information set maintains each data packet separately, such that each data packet may be independently accessed by the storage device.

12. The system of claim 1, wherein the microcontroller is configured to create and transmit said data packet after 24 hours if no change in any parameter is communicated by said sensors.

13. The system of claim 1, wherein said change in at least one parameter is one of a 10% change in water temperature or a ¼ gallon change in flow rate.

14. The system of claim 1, wherein the microcontroller is powered by a battery.

15. A method of monitoring water usage comprising:
providing at least one microcontroller representing a location, each microcontroller in communication with at least one sensor and having a counter, at least one input, and a transmitter;
communicating parameters from a at least one sensor to the at least one input in response to a change in water usage parameters, wherein the at least one input includes an active state and a static state, wherein the at least one input is configured to selectively receive parameters at a first time interval in the active state and a second time interval in the static state, wherein the first time interval differs from the second time interval;
creating a data packet utilizing said counter and parameters in response to a change in at least one of said parameters;
transmitting the data packet to a data collection device wirelessly via a transmitter;
receiving each data packet from each of the at least one microcontrollers;
creating an information set including each received data packet; and sending the information set to a storage device via the internet.

16. The method of claim 15, wherein the water usage parameters are at least one of water flow rate, water temperature, and water pressure.

17. The method of claim 15, further comprising the step of adjusting water usage in response to an information set.

18. The method of claim 15, further comprising the step of creating a heartbeat such that each of the at least one microcontrollers sends at least one data packet every 24 hours.

19. The method of claim 18, wherein the data packet includes a time stamp and a battery strength indicator.

20. The method of claim 15, wherein the step of transmitting the data packet to a data collection device via a transmitter is done in response to a condition of no change in any water usage parameters for a predetermined amount of time.

21. The method of claim 15, wherein the data packet includes water usage parameters, a time stamp, a node address, a node identifier, and a battery strength identifier.

22. The method of claim 15, wherein the transmitter is a Bluetooth radio.

23. The system of claim 1, wherein the microcontroller is configured to instruct the at least one input to receive data at the first time interval in the static state when no change in water flow is detected and is configured to instruct the input to receive data at the second time interval in the active state when a change in water flow is detected.

24. The system of claim 23, wherein the first time interval is smaller than the second time interval.

25. The system of claim 24, wherein the first time interval is about every two seconds and the second time interval is about four times per second.

26. The method of claim 15, wherein the input receives data at the first time interval in the static state when no change in water flow is detected and receives data at the second time interval in the active state when a change in water flow is detected.

27. The method of claim 26, wherein the first time interval is about two times per second and the second time interval is about four times per second.

* * * * *